United States Patent [19]

Motosko, II

[11] 4,207,939
[45] Jun. 17, 1980

[54] TRACTION DEVICE

[76] Inventor: Stephen J. Motosko, II, 3130 Shirley Rd., Youngstown, Ohio 44502

[21] Appl. No.: 923,480

[22] Filed: Jul. 10, 1978

[51] Int. Cl.² .................................................. B60C 27/20
[52] U.S. Cl. ..................................... 152/221; D12/154
[58] Field of Search .............. 152/221, 222; D12/153, D12/154

[56] References Cited

U.S. PATENT DOCUMENTS

| 2,341,317 | 2/1944 | Faulds | 152/222 |
| 2,486,911 | 11/1949 | Becker | D12/154 |

FOREIGN PATENT DOCUMENTS

| 13452 | 10/1910 | Denmark | 152/222 |
| 2749259 | 5/1978 | Fed. Rep. of Germany | 152/222 |
| 406877 | 8/1966 | Switzerland | 152/222 |

*Primary Examiner*—John J. Love
*Assistant Examiner*—D. W. Underwood
*Attorney, Agent, or Firm*—Webster B. Harpman

[57] ABSTRACT

A traction device that can be removably mounted on a vehicle tire includes a plurality of non-deformable straps of a length greater than width arranged at evenly spaced intervals around the tread of the tire. Each strap has a series of transversely running ridges on it with a pair of flexible resilient loops of nylon cord that pass through apertures in the ends of each strap along opposite side walls of the tire holding the traction assembly adjacent the tire tread thereby increasing traction in mud and snow.

5 Claims, 4 Drawing Figures

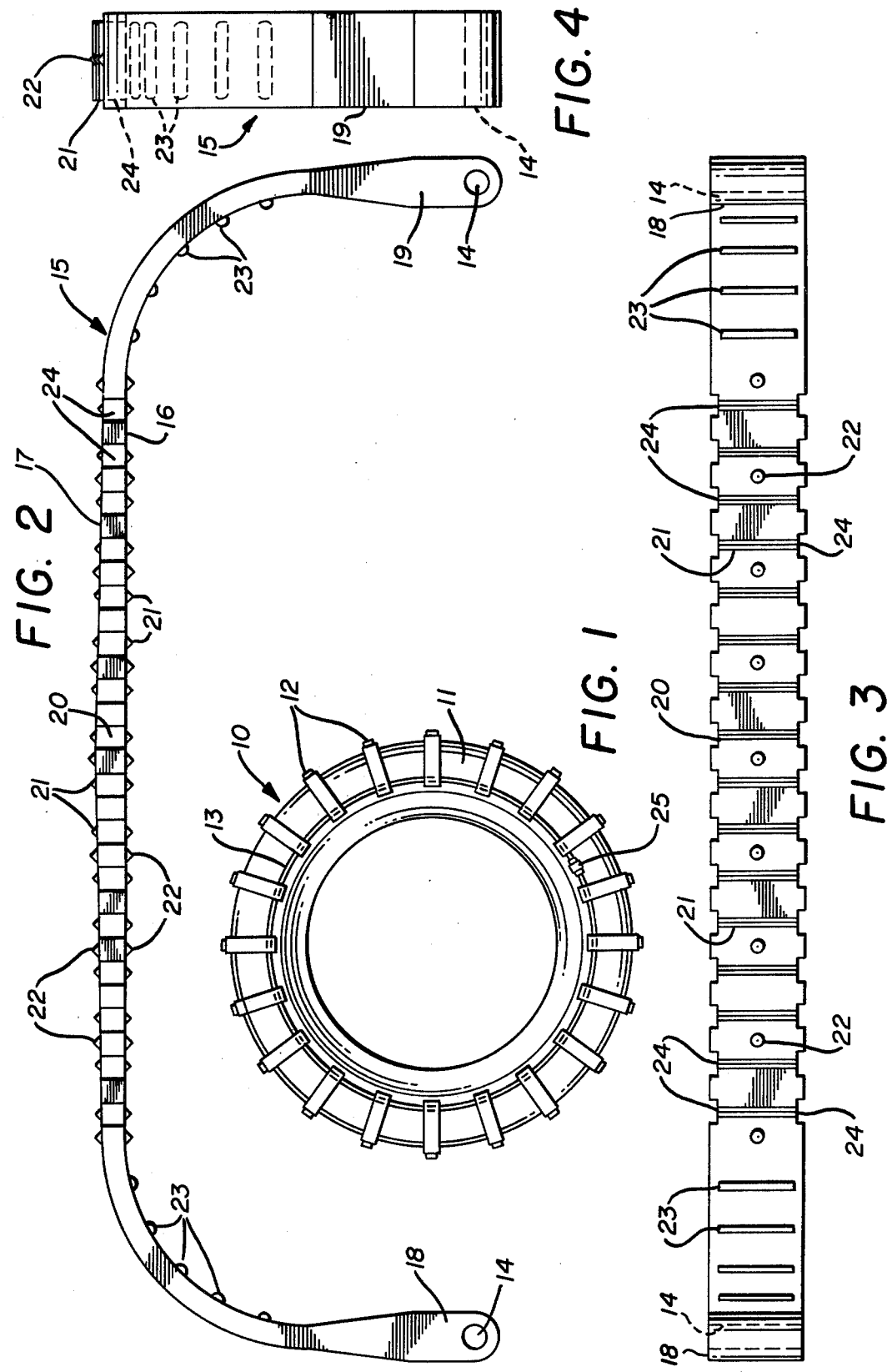

TRACTION DEVICE

BACKGROUND OF THE INVENTION (1) Field of the Invention

This invention relates to anti-skid traction devices that are removably mounted on vehicle tires.

(2) Description of the Prior Art

Prior structures of this type have utilized several different assemblies of removable traction devices. See for example U.S. Pat. Nos. 1,864,938, 3,056,444 and 3,817,307.

In U.S. Pat. No. 1,864,938 a thick traction strap is disclosed having rubberized fabric with wires woven in for engagement with the road surface.

In the present invention a one-piece molded strap of synthetic resin material is shown having a plurality of raised ridges that engage the road surface endwise.

U.S. Pat. No. 3,056,444 discloses a skid chain with cross members of rubberized interwoven nylon cord fabric attached at each end to chains on either side of the tire.

In the present invention molded straps of synthetic resin have a plurality of raised ridges on both sides thereof and are secured by a pair of nylon lines running longitudinally through each end of each of said straps.

In U.S. Pat. No. 3,817,307 an anti-skid assembly is disclosed having a series of straps across the tread, each of which has a plurality of horizontally mounted metal studs along each longitudinal edge that engage the road surface as the straps twist during use.

In the present invention semi-rigid straps are positioned over the thread of the tire and are so formed as to remain flat against the tire in use.

SUMMARY OF THE INVENTION

A traction device removably mounted on a vehicle tire has a number of straps of a length greater than width arranged at evenly spaced intervals around the perimeter of the tire. Each strap is formed from synthetic resin with a plurality of ridges transversely thereon. A pair of flexible resilient nylon cord loops pass through openings in the ends of each strap on opposite sides of the tire holding the traction assembly against the tire thread.

DESCRIPTION OF THE DRAWINGS

FIG. 1 is a plan view of the traction device on a tire;

FIG. 2 is a plan view of one of the straps of the traction device;

FIG. 3 is a bottom elevation of the strap seen in FIG. 1; and

FIG. 4 is a slide elevation thereof.

DESCRIPTION OF THE PREFERRED EMBODIMENT

By referring to FIGS. 1 and 2 of the drawings, a traction device 10 is shown removably mounted on a vehicle tire 11 and has a plurality of straps 12 held on the tire 11 by a pair of flexible resilient nylon cords 13 passing through apertures 14 in the ends of said straps 12. Each of the straps 12 is comprised of an elongated body member 15 the ends of which curve into right angular end sections formed from a wear-resistant and distortion-resistant synthetic resin based material. The body member 15 has inner and outer surface areas 16 and 17 with oppositely disposed end portions 18 and 19. A center portion 20 of the body member 15 is slightly thicker and tapers gradually towards each end. The right angular end portions 18 and 19 are thickened to provide material around said apertures 14 therein. A series of triangularly shaped raised ridges 21 are formed transversely on both the inner and outer surfaces 16 and 17 in the tread engaging center portion of the body member 15. The ends of the raised ridges 21 on the inner surface 16 engage the thread pattern on the tire 11 to prevent relative movement of the strap with respect thereto. A number of outwardly facing conical bosses 22 extend from both surfaces 16 and 17 in evenly spaced relation with respect to the raised ridges 21 and also engage the tread of the tire 11.

A number of elongated rounded ridges 23 are formed transversely on the inner curving surfaces 16 adjacent the end portions 18 and 19 of the right angular body member 15 and provide for slight flexing of said end portions.

As best seen in FIG. 3 of the drawings, the center tread engaging portion of the body member 15 has a plurality of longitudinally spaced wide rectangular notches 24 formed in each longitudinal edge thereof to form additional friction enhancing elements on the strap 12. The ends of the triangular shaped raised ridges 12 terminate in the notches 24.

In FIG. 4 of the drawings the end portion 19 is shown with the triangularly raised ridges 21 and conical bosses 22 at the uppermost portion of the body member 15.

In use the flexible and resilient nylon lines 13 are threaded through the apertures 14 in each of the ends 18 and 19 of the straps 12 forming a ladder-like assembly which is then placed on the tire with the ends of the flexible and resilient nylon line 13 attached to one another by fastening means 25, with the transverse raised ridges 21 forming projecting friction elements resisting transverse movement of the straps 12 and the notches 24 forming additional friction elements resisting endwise movement of the straps 12 and the tire they are on.

The assembled device once in place, will greatly improve the traction of the vehicle by maintaining increased frictional surfaces in contact with the road and snow, mud and the like.

It will thus be seen that a new and novel construction has been disclosed which can be easily and inexpensively manufactured.

Although but one embodiment of the present invention has been illustrated and described, it will be apparent to those skilled in the art that various changes and modifications may be made therein without dapparting from the spirit of the invention and having thus described my invention what I claim is:

1. In a traction device for a vehicle tire having a plurality of straps transversely of the tire in circumferentially spaced relation and engaged on annular members on either side of said tire; the improvement comprising said straps, each of which consist of an elongated distortion resistant synthetic resin body member having a center section, curving sections at either end of said center section and right angular apertured end sections, a plurality of longitudinally spaced wide rectangular notches formed in the longitudinal edges of said body member, a plurality of longitudinally spaced transversely extending triangularly shaped raised ridges on the inner and outer surfaces of said body member, said triangularly shaped raised ridges ending in said notches, the arrangement being such that the curving and right angular end sections extend alongside the side walls of said vehicle tire with the center section engaging the tread area of said vehicle tire.

2. The improvement in the traction device set forth in claim 1 wherein a plurality of conical bosses are positioned on said inner and outer surfaces of said body member between said raised ridges.

3. The improvement in the traction device set forth in claim 1 wherein the raised ridges are spaced in a configuration registrable with the tread pattern of said tire.

4. The improvement in the traction device set forth in claim 2 and wherein the conical bosses are of a size and shape registrable in the tread pattern of said tire.

5. The improvement in the traction device set forth in claim 1 wherein the centermost portion of said center section is relatively thicker than the curving and end sections thereof.

* * * * *